INVENTOR
JACKSON A. RANSOHOFF

BY Aughue, Rothwell, Mion, Zinn & Macpeak

ATTORNEYS

United States Patent Office 3,666,645
Patented May 30, 1972

3,666,645
MULTISTAGE POLYMERIZATION PROCESS WITH INDEPENDENTLY ADJUSTABLE RADIATION SOURCES
Jackson A. Ransohoff, Bethesda, Md., assignor to Neutron Products, Inc., Washington, D.C.
Filed June 1, 1967, Ser. No. 642,959
Int. Cl. C08f 1/16; C08d 1/00
U.S. Cl. 204—159.22
17 Claims

ABSTRACT OF THE DISCLOSURE

Emulsions and solutions of monomer are catalytically polymerized by irradiation by circulating a monomer containing process stream through a radiation field in a first stage, removing the heat of polymerization while maintaining temperature control, feeding from the first stage into a second process stage which is similar in operation to the first stage but with a higher proportion of polymer, and operating the second stage at a predetermined temperature, and continuing the steps of irradiation, under conditions of good temperature control until the reaction is completed or substantially completed. The volume of reactants exposed to the radiation field or the radiation dose to which the various process streams are exposed is adjusted to control the polymer content of each stage and provide for a steady flow of reactants through the system.

BACKGROUND OF THE INVENTION

(1) Field of the invention

This invention relates to improvements in a process of catalytically polymerizing by radiation emulsions and solutions of monomer.

Description of the prior art

A number of useful products are known to be produced by the polymerization of solutions and emulsions of various monomers in a carrier liquid. One of the more commonly produced emulsions is an emulsion of polyvinyl acetate in water. These emulsions are useful in the manufacture of certain paints and adhesives. In addition, co-polymers of polyvinyl acetate and other organic materials such as certain acrylic esters are produced commercially. Although polymers and co-polymers of other substances are produced by this general technique, and although the form of the fluid may vary from case to case only vinyl acetate and its co-polymers in solution or emulsion are used as examples for teaching the present invention. In the present state of the art, the polymerization of these monomer emulsions or solutions is catalyzed by the addition of chemical catalysts, such as potassium persulphate or benzyl peroxide. Recently work has been performed which has established the feasibility of using radiation as a catalyst to polymerize a number of monomer systems. Specifically, successful work has been performed on the production of polyvinyl acetate emulsions, using radiation as a catalyst. Whether radiation or chemicals are used to catalyze the polymerization, the characteristics of the polymer are a function of the reaction temperature. Furthermore, when a chemical catalyst is used, one has relatively little control over the catalyst concentration during the course of processing, and since reaction rate is also a function of temperature, one has only a limited ability to adjust both the reaction rate and polymer characteristics during the course of processing.

By contrast, if one uses radiation as the catalyst, one theoretically has a greater degree of freedom in selecting reaction temperatures, since it is practical to adjust the rate of catalysis at various stages in the reaction by adjusting the dose to which the reactants are exposed. Also, one theoretically has available the option of adjusting the degree of exposure of the reactants to the radiation field since the catalyst is not intimately mixed with the reactants.

It is one purpose of the present invention to teach novel and efficient methods for adjusting the exposure of reactants to a radiation field to assist in maintaining good control over reaction conditions. It is another purpose of this invention to teach novel and efficient means for varying the dose rate to which the reactants are exposed at various stages of polymerization. It is a further purpose of this invention to teach a method for realizing the potential of radiation catalysis for greater flexibility in the choice of process temperature.

SUMMARY OF THE INVENTION

The foregoing purposes are accomplished by providing a method for irradiating monomer emulsions and solutions to discrete levels of polymerization under certain controlled conditions in plural stages. By adjusting the radiation dose rate or the volume of reactants exposed to the radiation in each stage, the desired degree of conversion at a desired temperature can be provided.

BRIEF DESCRIPTION OF DRAWING

One mode contemplated of carrying the invention to practice will be described in detail below taken in connection with the accompanying drawing in which.

DESCRIPTION OF A PREFERRED EMBODIMENT

Figure 1:
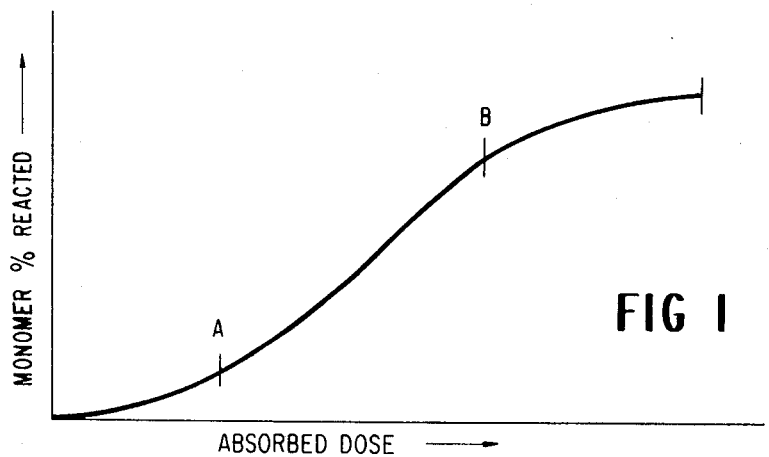
FIG. 1 is a curve in which the percent of monomer reacted is plotted against absorbed dose.

FIG. 1 which describes the relationship between the degree of conversion and the absorbed dose for polyvinyl acetate helps illustrate a general problem in efficient radiation polymerization. Initially, there is relatively little reaction per unit of radiation energy absorbed, but following the initiation stage the reaction proceeds as a linear function of absorbed dose from point A to point B, where the yield decreases, due to the lower concentration of monomer, to an asymptotic type relationship. Since the heat of polymerization is proportional to the extent of monomer conversion to polymer, the requirements for heat removal per unit of radiation energy absorbed are different for the reaction initiation phase, the bulk of the polymerization phase, and reaction termination phase. Furthermore, it is noted that the viscosity may increase from the few centipoises to over 1,000 centipoises as the polymer content increases; and as a result the heat removal capability, and, for a given pumping power, the flow rate, may decrease during the course of the reaction. Since the product properties are a function of the reaction temperature, close control of temperature is desirable, and may be achieved by practicing the teachings of the present invention.

Figure 2:
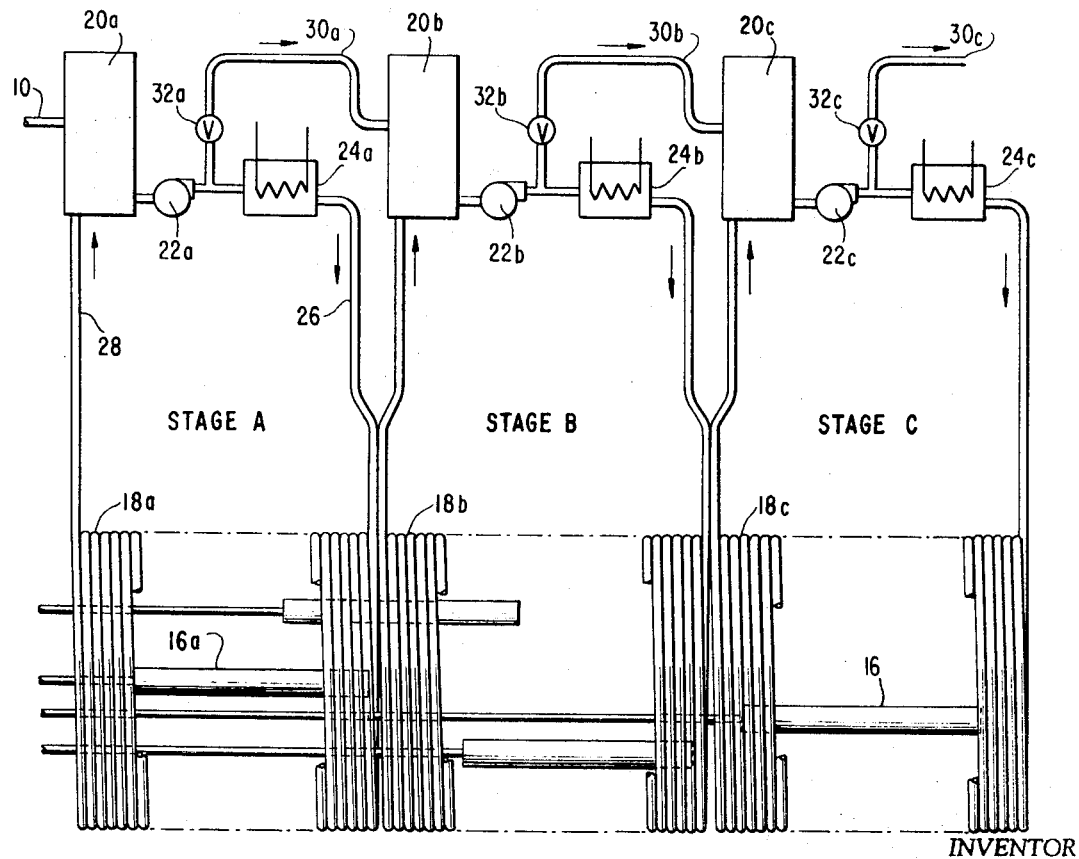
FIG. 2 is a schematic process flow diagram for practicing the process of this invention.

Reference can be made to FIG. 2 for a more specific description of the process of this invention. As can be seen from FIG. 2 the process is carried out in multiple stages such as stages A, B and C. Each stage includes a radiation source 16 and tubular conduits in the vicinity of the radiation source and extending to apparatus outside the high intensity radiation field. Each stage shown has a surge tank 20, pump 22 and heat exchanger 24. Conduits 26 and 28 connect the surge tank and the heat exchanger with conduit 18 in the radiation field as shown.

Preferably, there are a plurality of radiation sources 16 as shown and each would have an active length, say the length of one stage, shorter than the length of the whole irradiation chamber. By varying the axial position of the sources, the radiation dose rate for each of the stages may be adjusted.

Practice of the present inventive process admits of many alternatives. The conduit 18 may be in other than coil shape and may be many other configurations. If desired, a single pump and a single surge tank could be used for multiple stages, since a stage may be characterized, within a given process loop, as an adjustment in radiation dose rate, the volume exposed to radiation, or temperature. Also, a heat exchanger may not be required for a stage (such as stage C) where the heat of polymerization released in going from the polymer content of stage B to the polymer content of stage C is equivalent to the heat required to raise the temperature of the contents from the operating temperature of stage B to the desired operating temperature of stage C.

In one mode of operation as shown in FIG. 2, monomer is introduced through inlet 10 into surge tank 20a. Monomer-polymer mixture in stage A is circulated by pump 22a through coil 18a and radiation from source 16 catalyzes the reaction. The reactants circulated through surge tank 20a by pump 22a are cooled by heat exchanger 24a to a controlled temperature. A monomer-polymer reactant stream polymerized to a desired ratio, is withdrawn through outlet 30a and the amount withdrawn is controlled by valve 32a. The output from stage A is the input to stage B, it being introduced into surge tank 20b and mixed with a continuously recirculated monomer-polymer mixture in stage B which has a higher percentage of polymer than in stage A. The operation of stage B is the same as stage A and may be operated at the same process parameters such as operating temperatures, dose rate, etc. as stage A, or under different conditions. In any event, it is important that the buildup of reactants in any stage of the system be avoided. This can be accomplished by adjusting the dose rate so that the product of the dose rate and the volume of reactants exposed in any one stage is such that the dose administered to the reactants during the course of processing in each stage is equal to that required to effect the degree of polymerization required in any particular stage.

The output of stage B is withdrawn from line 30b controlled by valve 32b and fed to the inlet of stage C, namely the surge tank 20c. Stage C again operates similar to stages A and B with either the same or different process parameters.

It can be seen that the process described is continuous and that a monomer-containing liquid is first mixed with a stream which contains a significant quantity of polymer and is circulated through a process tube in the vicinity of the radiation source. The heat of polymerization is removed in the heat exchanger and the temperature is carefully controlled by controlling the temperature of the heat exchanger coolant and the flow of reactants. Effluent from this stream is fed into another process stage having a higher proportion of polymer and also maintained at a predetermined temperature. The second process stream is also circulated through the reaction zone to be irradiated and through a heat exchanger to have its temperature controlled. These steps are continued until a high degree of polymerization is reached or until the reaction is completed. It is possible to complete the polymerization by means other than irradiation outside the radiation field.

The volume of reactants exposed to the radiation field can be varied by varying the volume of the process tubes in the radiation field assigned to a particular stage or by varying the number or size of process tubes in use for any one process stage. To vary the relative dose rate on the process tubes of the separate stages surrounding the radiation source, the radiation sources may be moved axially within the helical tubes.

Although a continuous multi-stage process has been described above, it is within the scope of this invention to provide a semi-continuous multi-stage process. In such a process monomer is fed to the surge tank of the first stage as in the continuous process except that the feed instead of being continuous is periodic and of an extent required to fill the surge tank from a predetermined lower level to a predetermined upper level. In turn Stage A operates to increase the polymer content to that desired as output from the first stage intermediate between that value and zero. After the polymer content of the first stage reaches the desired level, the valve connecting stage A and stage B opens to permit the flow of reactants from stage A to stage B until the prescribed lower level of reactants in stage A is reached. Simultaneously, in stage B the previously depleted surge tank is now replenished with feed from stage A so as to increase to the previous level, the volume of reactants at a decreased average polymer content. In stage B the radiation to effect polymerization proceeds until the desired polymer content for the output of stage B is reached. At this point a valve between stage B and stage C opens permitting the flow of reactants from stage B to stage C until the level of reactants in the surge tank of stage B has reached its lower level. Similarly, stage C is operated to raise the polymer content of the reactants from the new average value which occurs in stage C immediately upon filling to the polymer content desired as a discharge from stage C and the process is repeated from stage to stage until the reaction is complete.

It is possible and in many cases even preferable to operate the process in the manner whereby the first few stages are continuous and the later stage is semi-continuous. When one considers the use of radiation to complete the reaction this is particularly desirable as an intermediate stage between continuous processing and batch processing for the final stage. Thus, for example, stage A may be operated continuously and feed into stage B which would also be operated continuously and stage B would feed continuously into a hold-up tank for periodic feed for stage C which would be operated semi-continuously. Stage C in turn would feed into a termination stage D not shown in the figure and preferably stage D would be nearly completely drained prior to refilling using the effluent from stage C.

Another advantage of operating the latter stages on a semi-continuous basis can be appreciated by considering the non-linear relationship between dose and degree of polymerization as one approaches the completion of the reaction. For example, if the effluent of stage B were to have a polymer to monomer ratio of approximately 3:1 and the effluent from stage C, a polymer to monomer ratio of say 20:1, and if stage C were to be operated as a continuous process, then the efficiency of polymerization would be governed by the dose rate required per unit of polymerization at the 20:1 level. On the other hand, if stage C were to be operated semi-continuously, the dose required would be lower initially corresponding to that required for polymerizing at some intermediate polymer monomer level, say 4:1, and the dose required would increase only gradually as the polymer content of stage C increased.

A non-limiting example will now be given to illustrate the present invention.

EXAMPLE 1

An emulsion of vinyl acetate monomer in water is fed into stage A of a three stage continuous process which has added to it a batch termination stage. This stage of the process has an equilibrium polymer-to-monomer ratio of approximately 0.3. In stage A, the temperature of which is maintained at 10° C.±1°, the mixture of monomer and polymer emulsion is pumped through a radiation field at a rate sufficient to limit the temperature rise of the reactants to approximately 1° C. The average dose rate should be on the order of 200,000 R./hr. Reactants flow from the radiation environment to a heat exchanger, which reduces the temperature of the reactants to the original temperature and thence to the pump so as to effect the continuous circulation of reactants within the stage.

Surge volume is provided within the stage, but in a continuous process it is desirable to maintain the volume of reactants in the stage relatively constant. Stage A is connected to stage B by a line from a point in stage A which operates at a higher pressure than the point in stage B to which the line is connected. The valve, which is controlled either by the liquid level in the surge tank of stage A or by the viscosity of the reactants in stage A, controls the flow of reactants from stage A to stage B but in any event the feed from stage A to stage B has a polymer-to-monomer ratio of 0.3, the equilibrium polymer content of stage A.

Stage B, the temperature of which is also maintained at 10° C., has a polymer-to-monomer ratio of about 3 and as in the case of stage A is equipped with a surge tank, a heat exchanger, a pump and a volume within the radiation zone. Appreciably more heat is generated in stage B than in stage A and accordingly stage B will require more heat removal capacity than stage A. Furthermore the viscosity of the reactants will be substantially higher in stage B than in stage A so that unless the velocity in the heat exchanger in stage B is substantially higher than in stage A, more than the proportionate amount of heat transfer surface will be required. Based upon FIG. 1, the polymer-monomer ratios have been selected to require approximately the same dose. Accordingly, for equal dose rates of the volume of stage B exposed to the radiation field is about the same as the exposed volume of stage A. In any event, the position of the sources may be adjusted to provide for a ratio of dose rates on the contents of stage A and the contents of stage B so as to maintain equilibrium between the two stages.

Continuing with the example of a continuous process, stage B feeds into stage C which is also operated at a temperature of 10° C. and, insofar as composition is concerned, is operated at a point on the curve above B in FIG. 1, in this example a polymer-monomer ratio of about 10. Considerations as to the choice of the radiation volume, dose rate, and heat transfer capability of stage C are the same as for stage B. To complete the reaction, the contents of stage C feed into a termination stage which differs from the other stages in two respects. First, it does not have to be cooled since the capacity for temperature rise is only about 15° C. in any event; and second, it is operated as a batch process, the concept of continuous feed and bleed being incompatible with achieving the highest degree possible of monomer consumption. The transition from continuous to batch process may be accomplished either by feeding from stage C into a hold-up tank or by operating the termination stage as two systems which are alternately fed from stage C. The polymerization in the termination stage may be effected by radiation as in the case of the other stages; but chemicals may also be added at this point to catalyze the termination of the reaction. Also, if conditions of product quality permit, the temperature of the termination stage may be raised in order to increase the rate of polymerization in that stage.

EXAMPLE 2

Consider the process of Example 1 up to the point of stage C. Stage C is equipped with a surge volume equal to three times the capacity of the operating portion of the system. As in Example 1, feed to stage C is from stage B and has a polymer-to-monomer ratio of 3. Feed from stage B to stage C is into a hold-up tank which gradually fills as stage C is operated. When operation of stage C has proceeded to the point where the desired polymer-monomer ratio, twenty in this example, has been achieved, the contents of stage C are fed into the termination stage until the lower level of reactants in the surge tank is reached. At this point, the removal of reactants from stage C stops, and the contents of the hold-up tank are admitted to the surge tank of stage C thereby reducing the polymer-to-monomer ratio in stage C from 20 to 4.

The operation of stage C continues now with the polymer-to-monomer ratio gradually increasing until a level of 20 is again reached at which time the discharge of a portion of the system and the replenishment with feed from stage B is repeated. As before, the contents of stage C are fed into a batch termination stage where the irradiation continues until the desired degree of monomer conversion has been achieved.

EXAMPLE 3

Another alternative afforded by practice of the teachings of the pesent invention relates to a convenient means of changing the temperature of reactants in proceeding from one stage to another. In Example 1, for instance, stage C could be operated at a temperature of about 35° C. simply by operating the stage without the cooling. The heat of polymerization would be utilized completely in raising the temperature of the reactants from stage B to the operating temperature of stage C and accordingly neither cooling nor heating is required to effect the desired change in operating conditions. Thus, in any stage of a continuous process, one may arrange for a step change in process conditions simply by providing sufficient dose to effect a change in polymer content from stage to stage which will provide the heat required to raise the temperature of the reactants from the temperature of the previous stage to the temperature desired in the stage under consideration.

Further illustrative of this technique, stage C of Example 2 may be operated without cooling so as to maintain the temperature of stage B. As an alternative, however, the stage may be operated uncooled allowing the temperature of the reactants to increase from approximately 18° C., the weighted average of three parts at 10° C. and 1 part at 43° C., to approximately 43° C. at the termination of polymerization in stage C.

Further in consideration of the details of the operation of the process of the present invention, and in particular with regard to the maintenance of equilibrium bewteen the various stages, consider the relationship between dose rate, the volume of reactants exposed in any particular stage, the requirements for dose to achieve the desired degree of polymerization, and the steady flow of reactants from stage to stage without build-up in any particular stage.

The process is operable over a relatively broad range of radiation dose rates, but a desirable level is on the order of several hundred thousand R./hr. The precise volumes exposed will depend upon the capacity of any particular plant but for purposes of understanding the teachings of the present invention, it is sufficient to consider relative volumes exposed to radiation at the various stages. The specific examples were selected for relatively uniform dose in each stage and, it is estimated that a dose of approximately 40,000 R. would be required to accomplish the degree of polymerization indicated for each of stages A, B, and C. In practice, the plant could be designed to have each stage operate at the same dose rate and to provide for exposure of the same volume of reactants to the radiation field in each stage, and the dose rate in each stage could be adjusted to provide for such minor modifications to dose rate as would be required to maintain a steady flow of material between the stages and to achieve the desired degree of polymerization at each stage.

This is relatively unimportant for circumstances where each stage of the process is operated at the same temperature. However, if one wished to operate different stages of the process at different temperatures in order to alter the properties of the product, then different doses would be required in each stage, and control of the degree of polymerization in each stage by adjusting the dose within each stage acquires additional value. Also, for hydraulic considerations, it can be desirable to design one or more stages to have different volumes exposed to the high intensity radiation field, and in such cases, it is advantageous to be able to adjust the dose rate among the stages to provide for a desired dose in each stage.

Various additions, changes and alterations may be made to the process and still be within the scope of this invention as defined by the appended claims. Some of these alternatives are: The alteration of product properties by operating different stages of the process at different temperatures as previously mentioned; the addition of additional monomer or other monomers to the process stream in one or more stages during the course of processing; the use of a multiplicity of equivalent systems whereby the size of any particular stage may be altered by adjusting the number of systems used in any particular stage; the admission of coolant to the radiation environment rather than the removal of reactants for heat transfer; and a continuous feed from one stage through a subsequent stage or stages.

What is claimed is:

1. A process for the catalytic polymerization by radiation of monomer contained in a fluid system comprising;
feeding a monomer containing fluid to a first process stage, circulating the monomer containing fluid of the first process stage through a radiation field, the intensity of which is adjustable, to achieve a desired polymer-monomer ratio, and through a heat transfer zone to control the temperature thereof,
feeding the output of said first process stage to a second process stage, and exposing said polymer-monomer containing fluid from said first stage to a radiation field therein, the intensity of which is adjustable during operation with respect to the intensity of the radiation field of said first process stage, said exposure accomplished by
circulating the contents of said second stage through said second stage radiation field to achieve a polymer to monomer ratio higher than that of the monomer containing fluid in said first process stage.

2. A process as in claim 1 where the steps of at least one of the stages are repeated in at least one subsequent stage.

3. A process as in claim 1 further comprising control of the process by adjusting the volume of monomer containing fluid exposed to a radiation field in at least one of said stages.

4. A process as in claim 3 wherein the volume of monomer containing fluid exposed to the radiation field is adjusted by passing the monomer containing fluid through a number of reactant containing process loops passing through a radiation field.

5. A process as in claim 1 wherein the relative dose rate of different process stages is adjusted by varying the relative position of the source of said radiation field and the circulating fluid being irradiated.

6. A process as in claim 5 wherein in at least one process stage the circulating fluid passes through at least one conduit positioned around a centrally located radiation source.

7. A process as in claim 1 wherein the polymerization is completed by other than radiation catalysts.

8. A process as in claim 1 wherein the feed of output from the first stage to the second process stage is continuous.

9. A process as in claim 1 wherein the feed of output from the first process stage to a second process stage is semi-continuous.

10. A process as in claim 1 wherein feed to the process is semi-continuous.

11. A process as in claim 2 wherein the feed to any stage is continuous.

12. A process as in claim 2 wherein the feed to any stage is semi-continuous.

13. A process as in claim 1 wherein the temperature of the monomer containing fluid is closely controlled by circulating the reactants through a radiation field at such a rate as to provide for temperature control of about 1° C. for any one pass through a radiation field.

14. A process as in claim 2 further comprising adding additional monomer after the first stage.

15. A process as in claim 1 wherein the degree of polymerization in the second stage is selected to provide for a predetermined temperature rise from the temperature of the first stage.

16. A process as in claim 2 wherein the degree of polymerization in any stage is selected to provide for a predetermined temperature rise from a preceding stage in said stage.

17. A process as in claim 1 wherein said fluid system is in the form of a member selected from the group consisting of emulsions and solutions of monomer.

References Cited

UNITED STATES PATENTS 3,072,548   1/1963   Lucchesi et al. ____ 204—159.11

SAMUEL H. BLECH, Primary Examiner

R. B. TURER, Assistant Examiner

U.S. Cl. X.R.

204—193; 250—106